2,850,494

CHEMICAL PROCESS FOR PRODUCING ELEMENTAL BORON

John M. Finn, Jr., Cleveland, Ohio, assignor to Horizons Incorporated

No Drawing. Application September 1, 1955
Serial No. 532,099

8 Claims. (Cl. 23—209)

The present invention relates to a process for preparing elemental boron. More particularly, it relates to a process for preparing boron by the reduction of a boron halide by means of metallic zinc in accordance with the reaction:

$$2BX_3 + 3Zn \rightarrow 2B + 3ZnX_2$$

in which X is a halogen chosen from the group consisting of chlorine, bromine and iodine.

Elemental boron has been prepared by various methods including the reaction of a boron halide with either hydrogen or an alkali or alkaline earth metal. The reaction with hydrogen, as described in U. S. Patent 1,046,043, may be achieved in an electric arc, but the method requires expensive apparatus and carefully controlled reaction conditions to produce the desired result. The reduction by means of an alkali metal, for instance, as set forth in U. S. Patent 2,685,501 requires an expensive starting material, and is therefore economically unattractive. Furthermore, in prior art processes such as those above described, the freshly formed boron tends to react with either the hydrogen, to form hydrides or with the alkali or alkaline earth metal to form borides, thereby lowering the yield and creating a problem in the separation of boron from the unwanted side reaction products.

I have now discovered that suitable boron trihalides may be reacted with metallic zinc to produce elemental boron in substantially pure form. The reactants are readily available commercially in adequately pure form. By the choice of zinc as one of the reactants many of the disadvantages associated with the prior art are avoided and a number of hitherto unobtainable advantages are realized. Unlike the alkaline earth, alkali and other metals, zinc exhibits substantially no tendency to form a boride. Consequently, the product is obtainable in relatively purer form than that produced heretofore. For purposes of illustration, I will now describe the process with boron trichloride as the boron halide.

Fifty grams of zinc were placed in a zinc boiler, which was connected to a quartz reactor tube by means of quartz tubing provided with resistance-wire winding so that it could be continuously heated in order to insure that the zinc conducted to the reactor was in the vapor state. The zinc entered the reactor through a quartz jet at one end. Adjacent to the zinc jet was a second jet for entry of the boron trichloride, supplied under pressure from a tank. Before the reaction was begun the system was dried for several hours at about 400° C. The heat on the zinc boiler was then increased and as the boiling point of zinc was approached the flow of boron trichloride was started. The boron trichloride sweeps the apparatus free of air and prevents oxidation of the zinc. As the temperature of the zinc approached the boiling point, the temperature of the reactor tube was also raised. During the reaction the reactor tube was maintained at about 950° C. The flow of boron trichloride was kept in the range 10–25 g./hr. Over a period of about 3 hours the zinc was all vaporized and about 3 grams of boron had deposited in the tube. A baffle was provided adjacent to the exit end of the reactor tube to minimize carry-over of the solid boron. The excess zinc, zinc chloride, and excess boron trichloride were collected separately by fractional condensation in a manner well known in the art, for reuse in subsequent runs. The reactor tube was cooled before admittance of air. The boron deposit produced was mechanically removed from the walls of the tube and was found to be substantially pure elemental boron.

In a subsequent experiment, carried out in a somewhat larger apparatus, following the same general procedure as above outlined, using flow rates of about 300 grams/hour of boron trichloride and about 500 grams/hour of zinc vapor, about 150 grams of boron were produced in a period of about 8 hours. This represents a yield of over 70%.

By suitably controlling the temperature of the reactants, the reaction may be effected between boron trichloride in vapor form and metallic zinc in either vapor, liquid or solid form. In the preferred embodiment of my invention zinc metal is heated to a temperature slightly above 907° C., and zinc vapors are introduced into a reaction vessel wherein they come in contact with boron trichloride vapor which has also been heated to a temperature of above 907° C. The vapors react, with immediate formation of solid elemental boron which deposits in the reaction vessel. Unconverted zinc vapor, boron trichloride vapor and zinc chloride vapor pass out of the reaction vessel and are separately recovered by any suitable means. Preferably the zinc chloride is condensed and thereby separated from the remaining vapors which are returned to the reaction vessel. The zinc chloride may be reprocessed in any known fashion to recover the values therefrom or may be sold as zinc chloride. Thus zinc metal or boron trichloride may be prepared from the zinc chloride in order to repeat the process. The boron product of my reaction, if reaction conditions have been properly controlled, is often better than 99.99% pure.

It is also possible to effect the reaction between liquid zinc and boron trichloride vapor, for instance, by spraying the liquid metal into a reaction vessel containing the boron halide vapor. Again solid boron produced by the reaction settles to the bottom of the reaction vessel and unreacted vapors are recycled for recovery of their values. Any unreacted zinc which is in the form of a liquid may be rapidly removed from the solid boron by application of heat to vaporize the zinc, or by other conventional methods for separating the two.

At temperatures below 419° C., the reaction proceeds between solid zinc and boron chloride vapor. The zinc is preferably in finely divided form and may be carried into the reaction vessel in a carrier stream of inert gas. The zinc chloride formed separates from the solid boron either as a liquid or as a solid, depending on the temperature.

While I have described my invention in terms of boron trichloride, the reaction may be effected with either boron tribromide or boron triiodide in place of the trichloride. For reasons of economy, I prefer to use the trichloride. Boron trifluoride has not been found amenable to the process above described and this is in agreement with the calculated free energy relationships which indicate that the reaction between zinc and boron trifluoride does not proceed to any measurable extent under the conditions outlined above.

The reaction between zinc and a suitable boron halide may be carried out at a pressure of one atmosphere or higher or lower pressures, according to the particular combination of temperature and reactants employed. For example, when both the zinc and boron trichloride are in the form of a vapor, the use of superatmospheric pressures is particularly effective.

The foregoing description is to be considered as illustrative only and not in a limiting sense, in view of the many changes and modifications of which it is capable.

I claim:

1. The process for preparing elemental boron by reducing a boron trihalide other than the trifluoride with zinc which comprises reacting zinc metal in the form of a vapor with a boron halide selected from the group consisting of boron trichloride, boron tribromide and boron triiodide, said boron halide being in the form of a vapor, and recovering the resulting boron.

2. The process of claim 1, in which the boron halide is boron trichloride vapor.

3. The process of claim 2 in which the reaction between the zinc and the boron halide is carried out under superatmospheric pressure.

4. The process for preparing elemental boron which comprises forming a vapor of a boron halide from the group consisting of boron trichloride, boron tribromide and boron triiodide, reducing said vapor with zinc in elemental form, and recovering the boron produced by reaction between the metal and the halide.

5. A process for preparing elemental boron which comprises reducing a trihalide of boron in vapor form from the group consisting of boron trichloride vapor, boron tribromide vapor and boron triiodide vapor by means of metallic zinc in finely divided form, and recovering the boron so-produced.

6. The process of claim 5 in which the zinc is a finely divided solid.

7. The process of claim 5 in which the zinc is a finely divided liquid.

8. The process of claim 7 in which the reduction is effected by spraying the liquid zinc into a reaction chamber in which the boron trihalide is present as a vapor.

References Cited in the file of this patent

UNITED STATES PATENTS

| | | |
|---|---|---|
| 1,306,568 | Weintraub | June 10, 1919 |
| 1,774,410 | Van Arkel | Aug. 26, 1930 |
| 2,313,410 | Walther | Mar. 9, 1943 |

OTHER REFERENCES

Mellor: "Comprehensive Treatise on Inorganic and Theoretical Chemistry," vol. 5, page 8, 4th paragraph; vol. 4, page 489.

"Preparation of Hyper-Pure Silicon," D. W. Lyon, C. M. Olson, and E. D. Lewis, Journal of the Electrochemical Society, volume 96, Number 6, December 1949, pages 359–363.